April 15, 1930.  A. HOPKINS  1,754,320
FILTER
Filed Dec. 20, 1928  3 Sheets-Sheet 1
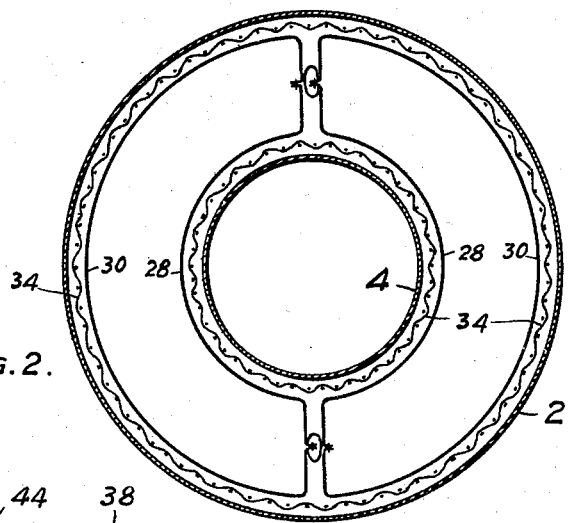
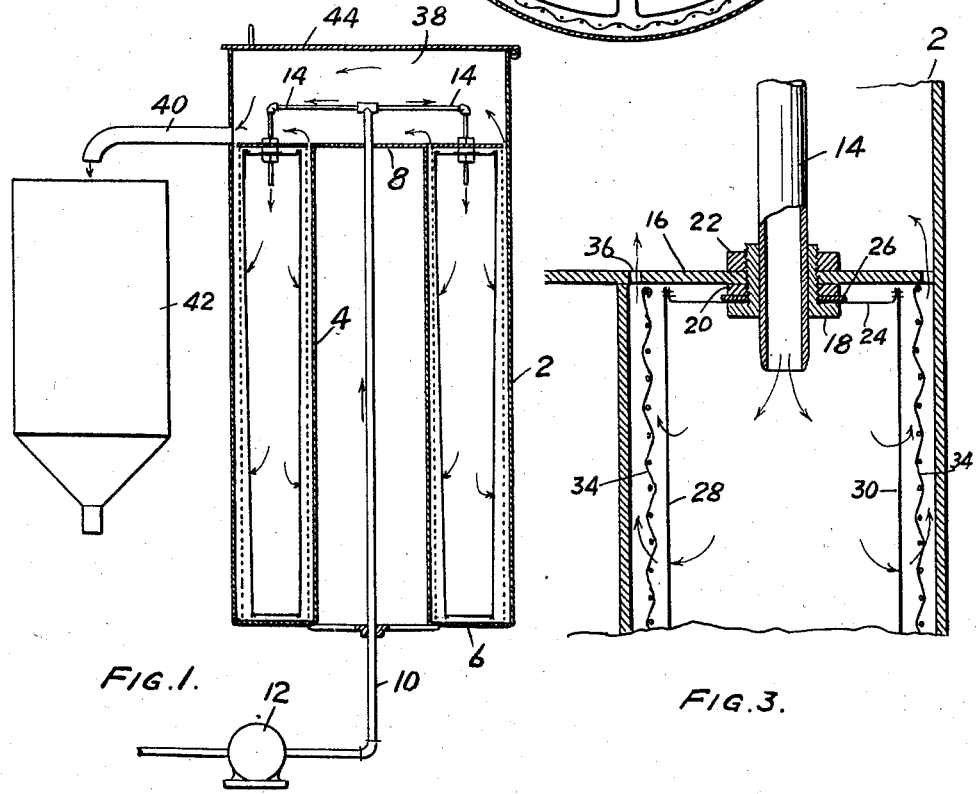
INVENTOR
Alfred Hopkins
BY
ATTORNEYS.

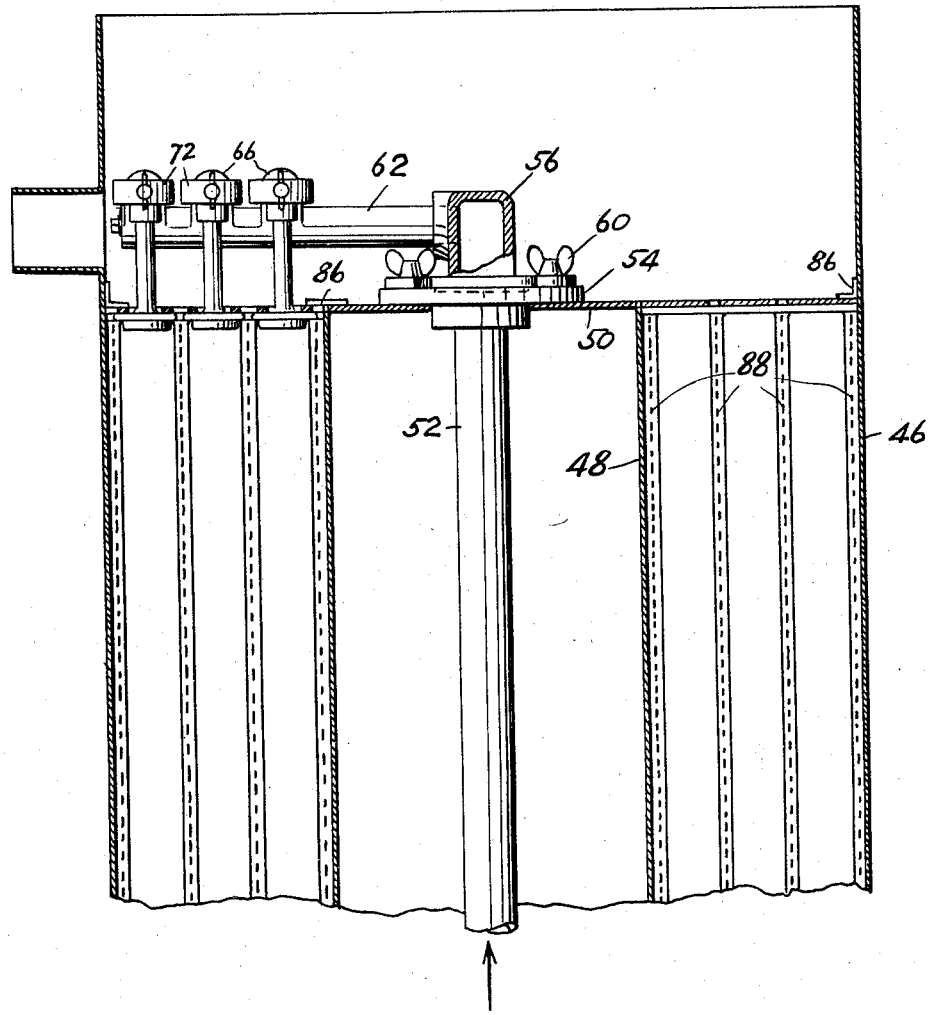

April 15, 1930.　　　A. HOPKINS　　　1,754,320
FILTER
Filed Dec. 20, 1928　　3 Sheets-Sheet 3
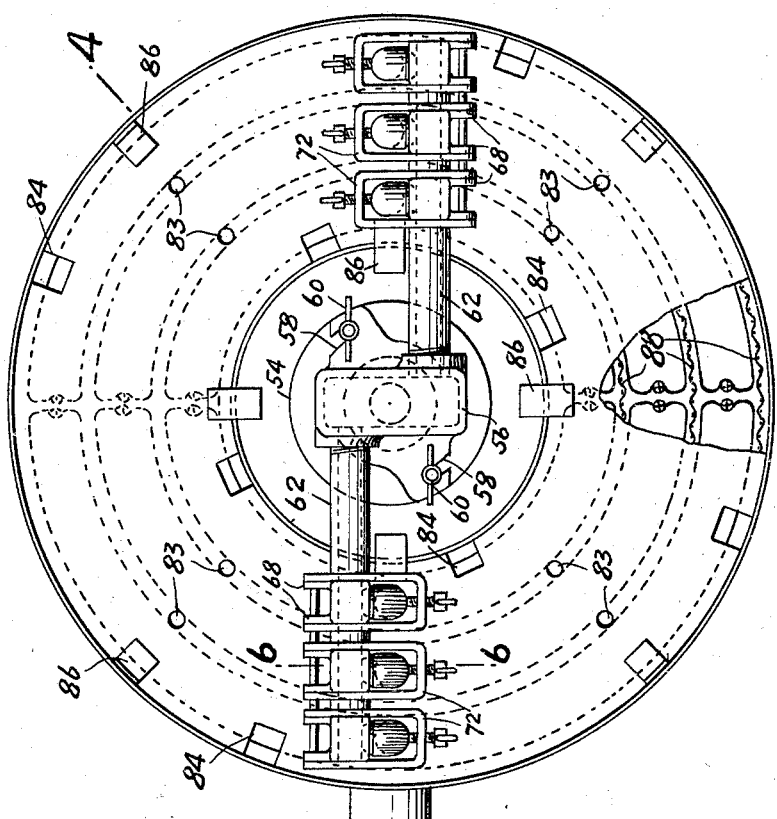
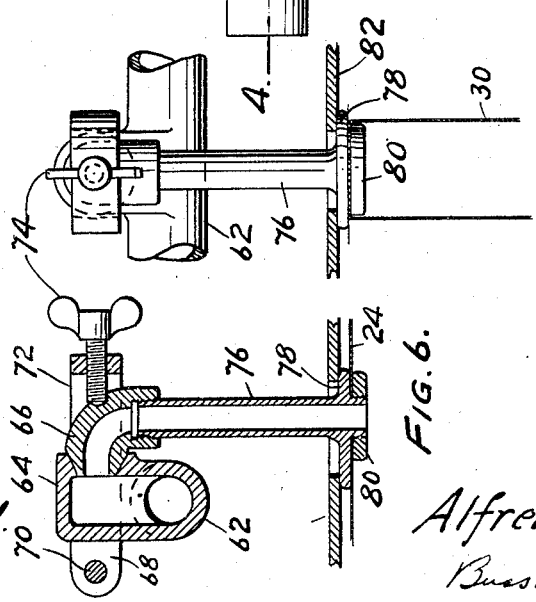
INVENTOR
Alfred Hopkins
BY
ATTORNEYS.
WITNESS:

Patented Apr. 15, 1930

1,754,320

UNITED STATES PATENT OFFICE

ALFRED HOPKINS, OF PHILADELPHIA, PENNSYLVANIA, ASSIGNOR TO HOPKINS-TULL MACHINERY COMPANY, OF PHILADELPHIA, PENNSYLVANIA, A CORPORATION OF PENNSYLVANIA

FILTER

Application filed December 20, 1928. Serial No. 327,321.

This invention relates to a filter for oil or the like and more particularly to a type of filter designed for operation under pressure.

The objects of the present invention include the provision of a filter which is compact in structure and which will stand up well under considerable pressure. The filter of the present invention includes fabric filter bags and further objects relate to the provisions of suitable bags which, while being useful in a compact structure, may be readily cleaned and which are so arranged as to stand up well under continuous use.

Other objects and advantages will apparent from the following description read in conjunction with the accompanying drawing, in which:

Fig. 1 is a vertical section through one form of the improved filter.

Fig. 2 is a horizontal section through the filter bags and the vertical walls of the casing of the modification of Fig. 1.

Fig. 3 is an enlarged fragmentary section of a portion of the device shown in Fig. 1.

Fig. 4 is a vertical section through an alternative modification, the section being taken as indicated at 4—4 in Fig. 5.

Fig. 5 is a plan view, partly broken away, of the second modification.

Fig. 6 is a detail section of the connection of a bag to the feed manifold, the section being taken on line 6—6 of Fig. 5.

Fig. 7 is an elevation of the connection illustrated in Fig. 6.

Referring first to the modification shown in Figs. 1, 2 and 3, the casing comprises an outer cylindrical wall 2 and an inner cylindrical wall 4 arranged as shown in Figs. 1 and 2, so as to form a continuous annular chamber therebetween. The bottom wall of this annular chamber is formed by a plate, joining the bottom edges of walls 2 and 4. As illustrated, wall 2 extends above wall 4, whereby an upper chamber is provided, a circular plate 8 enclosing the top end of the circular wall 4 forming the bottom for this chamber.

Extending forwardly through the central portion of the casing is a pipe 10 into the lower end of which is forced oil under pressure by means of a pump 12. The upper end of pipe 10 is provided with a T to which are secured pipes 14 forming branches for the flow of oil or other liquid from pipe 10. The outer ends of pipes 14 are extended downwardly and secured thereto are plates 16 of semi-circular form. These plates are secured through the medium of bushings 18 clamped on the ends of pipe 14 and provided with nuts 20 and 22, plates 16 being secured between these nuts 20 and 22.

The bushing is provided with a head and between this head and the adjacent nut 20 there is secured a top wall 24 of a filter bag, the top 24 being reinforced by means of a portion of reinforcing material 26.

As shown in the drawing, there are provided two filter bags of similar construction, each one having a top 24, an outer side wall 30 and an inner side wall 28, the inner and outer walls being joined together by vertically extending seams and being joined to the top wall by similar seams. Each bag is also provided with a bottom joined to the side walls. The bags are formed of porous material, such as canvas, or other fabric, the holes through which are sufficiently fine to remove from oil or other liquid in the filter the solid particles which are undesirable. Each of these bags is semi-circular in form and preferably tapered towards the bottom, as shown, and the two together, arranged as shown in Fig. 2, substantially completely fill the annular chamber formed between walls 2 and 4 of the casing.

In order to properly support the side walls of the bags and prevent their contact with the walls of the casing, which would prevent proper filtration, the bags are spaced from the walls by means of wire mesh screens 34. These screens serve to support the walls of the bag and prevent their breaking under internal pressure and also serve to prevent extended contact of the bags with the walls, which would prevent issue of oil therethrough.

The chamber 38 at the top of the casing is provided with an opening communicating with a discharge pipe 40, which is arranged to discharge into a receptacle conventionally illustrated at 42. The chamber 38 is provided with a hinged cover 44 which is arranged to provide fluid tight closure of the top of the casing. Cover 44 may be released and raised to permit withdrawal of the filter bags to permit their replacement or cleaning.

The structure described offers a maximum amount of the filter surface for a given amount of floor space. By reason of the fact that the filter elements proper consist of two separate bags rather than a single annular shaped bag, separate withdrawal of the two portions may be effected and cleansing may be readily accomplished, since both the inner and outer walls of the bags are accessible for cleaning.

A greater ratio of filtration area to space occupied by the filter may be obtained by arranging the bags in concentrically related groups. The modification shown in Figs. 4 to 7, inclusive, discloses this arrangement of these filter bags and also shows desirable means for mounting the filter bags so that removal and replacement is facilitated.

In this second modification, the casing comprises an outer cylindrical wall 46 and an inner cylindrical wall 48 concentric with wall 46. An annular plate connects the bottom edges of the two concentric walls in a manner similar to that shown in the prior modification, thereby forming a closed annular chamber. Also, similarly to the arrangement heretofore discussed, a plate 50 closes the upper end of the cylindrical wall 48, thereby providing an upper chamber into which the overflow filtered oil or the like may be received and from which it will be discharged to a proper receptacle. The vertical intake pipe 52, which is concentric with the casing walls, is provided at its upper end with a flange 54 secured to the upper side of plate 50, through which a portion of flange 54, secured to pipe 52, passes. The flange is provided with a central opening, thereby forming a continuation of pipe 52 for the flow of oil. A casting 56, which is of the form shown in Figs. 4 and 5, provided with oppositely extending exit openings, includes a lower flange which is slotted, as indicated at 58, to embrace stud bolts extending upwardly from flange 54. Wing nuts 60, arranged to engage over the bolts, serve to clamp the flange of the casting against flange 54 when the slots 58 are arranged to embrace the bolts.

Oppositely extending from the exit openings of casting 56 are feed manifolds 62. In the present instance, each of these manifolds is provided with three upwardly extending delivery portions 64 provided, as indicated in Fig. 6, with horizontally opening tapered holes into which tapered angle connections 66 may be secured, so as to provide a flow of oil through the manifold and through the connections and extension pipes 76 to the filter bags. At the rear of each upwardly extending delivery portion 64 are arranged ears 68 carrying pins 70 on which are pivoted yokes 72 extending forwardly and around the angle connections 66. Through each of these yokes is threaded a wing nut 74 which is adapted to engage within a suitable depression in its corresponding angle connection to secure the clamp of the angle connection to the manifold. Each downwardly extending pipe 76 is provided with a flange 78 between which and a nut 80, threaded on the lower extension of the pipe, is secured the top wall 24 of a semi-circular filter bag of the type described more fully in connection with the first modification. A large annular plate 82 is supported by engagement with the upper sides of flanges 78. This annular plate is provided with suitable holes 83 through which filtered oil may pass upwardly to the discharge. In order to properly retain the plate in position and positively hold the same downwardly, the plate is provided with notches 84 in its inner and outer edges which, when the plate is in one position, are arranged to align with projections 86 extending from the inner and outer walls of the casing. In this modification, screens 88 are provided not only between the outer bags and the casing walls, but also between adjacent bags to properly separate and support the same.

From the above it will be observed that the casting 56, the manifolds, the bags and plate 82 may be removed or replaced as a unit relatively to the casing. In removing the unit from the position shown in Fig. 5, the whole will be given a clockwise movement after freeing of wing nuts 60 in order to liberate the bolts from slots 58 and also to align openings 84 with projections 86. When this is accomplished, the entire unit may be lifted vertically and removed from the casing. The replacement of the unit is effected in a reverse manner.

What I claim and desire to protect by Letters Patent is:

1. A filter comprising a casing including inner and outer walls forming a continuous annular chamber and a discharge chamber above and communicating with the annular chamber, intake piping extending into the casing, and a plurality of filter bags within the chamber constructed to conform to the shape thereof and substantially fill the same, the intake piping communicating with the interiors of the bags and serving to support the same, passages being provided to guide filtrate to the discharge chamber.

2. A filter comprising a casing including inner and outer walls forming a continuous annular chamber and a discharge chamber communicating with the annular chamber, intake piping extending into the casing and including a distributing manifold, connecting members extending from the manifold, a plurality of filter bags within the chamber constructed to conform to the shape thereof and substantially fill the same, the connecting members communicating with the interiors of the bags and serving to support the same.

3. A filter comprising a casing including inner and outer walls forming a continuous annular chamber and a discharge chamber communicating with the annular chamber, intake piping extending into the casing and including a distributing manifold, connecting members detachably secured to the manifold, a plurality of filter bags within the chamber constructed to conform to the shape thereof and substantially fill the same, the connecting members communicating with the interiors of the bags and serving to support the same.

In testimony of which invention, I have hereunto set my hand at Philadelphia, Pennsylvania, on this eleventh day of December, 1928.

ALFRED HOPKINS.